Feb. 23, 1926.

E. H. STILL ET AL 1,573,879

STEAM TRAP

Filed May 28, 1925

Inventors
Ernest Henry Still and
Andrew George Adamson

By Dowell and Dowell
their Attorneys

Patented Feb. 23, 1926.

1,573,879

UNITED STATES PATENT OFFICE.

ERNEST HENRY STILL AND ANDREW GEORGE ADAMSON, OF LONDON, ENGLAND.

STEAM TRAP.

Application filed May 28, 1925. Serial No. 33,493.

*To all whom it may concern:*

Be it known that we, ERNEST HENRY STILL and ANDREW GEORGE ADAMSON, subjects of the King of Great Britain and Ireland, residing, respectively, at Hatton Garden, London, England, have invented Improvements in Steam Traps, of which the following is a specification.

This invention has reference to steam traps of the kind in which the discharge of water and steam is controlled by the contraction and expansion of fluid contained in capsules or chambers, the flexible walls of which are adapted to serve as valves for controlling the discharge orifices.

The capsule or chamber of such a trap generally comprises circular metallic plates providing front and back walls each in the form of a corrugated metal diaphragm with flanges fitted one within the other and soldered together. In order that the soldered joint may be satisfactory it is necessary that these flanges should be of considerable depth, and hitherto the capsule or chamber has been correspondingly deep with the result that a large charge of spirit or other expansible fluid has been required to make the trap sensitive to differences in temperature of the water and steam.

Now according to this invention one of the corrugated walls is formed with a hollow outwardly projecting marginal rim, the outer portion of which is extended inwardly to form the flange that is fitted and soldered to the flange of the other wall the one flange overlapping the other for a depth at least equal to the distance between the front and back walls. With this construction, without reducing the depth of the soldered flanges, the front and back walls of the capsule or chamber can be brought comparatively close together and the capacity of the capsule or chamber reduced so that it can be made as sensitive as usual with less contained spirit, or can be made more sensitive than usual.

Preferably the front wall is thus formed and its flange is soldered to the outside of the flange of the back wall but the back wall may be so formed instead of or in addition to the front wall.

Figure 1:
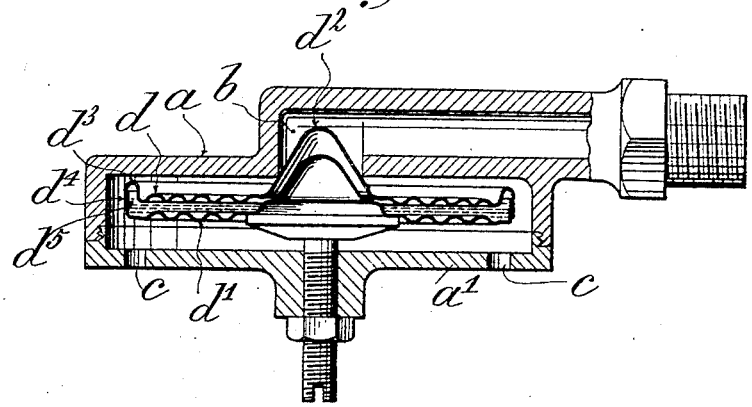
Figure 2:
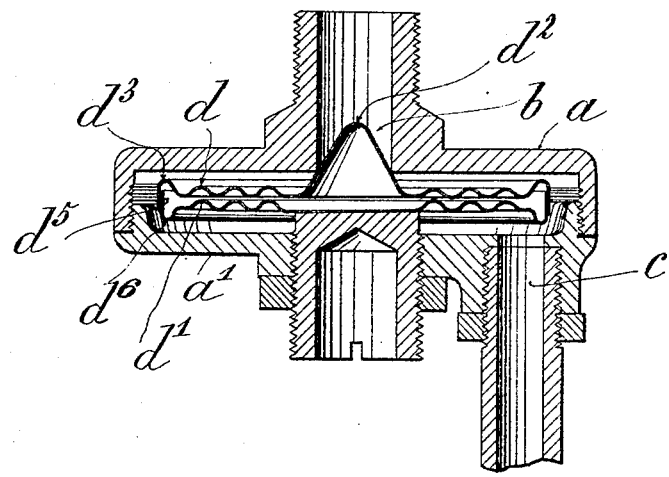

Referring to the accompanying drawing, Fig. 1 shows in section one form of steam trap having a capsule or chamber containing expansible fluid according to this invention. Fig. 2 is a similar view illustrating a modified construction.

$a$ is the trap casing having an inlet passage $b$ and outlet passages $c$ through a removable cover $a^1$. The capsule or chamber has a front wall $d$ and a back wall $d^1$ constituted by corrugated metal diaphragms, and the front wall is shown as being formed with a hollow conical projection or valve piece $d^2$ which, when steam enters the trap closes the inlet $b$ thereto, as well understood. The capsule or chamber is shown supported by an adjusting screw.

In the construction shown in Fig. 1, the front wall $d$ only is formed with a hollow marginal rim $d^3$ which projects forwardly that is to say outwardly or away from the interior of the capsule or chamber and a rearwardly extending flange $d^4$ which fits over and is soldered to a corresponding forwardly extending flange $d^5$ on the back wall $d^1$. As will be seen the overlapping flanges $d^4$ and $d^5$ are of adequate depth to enable a good soldered joint to be made between them and the front and back walls are close together so that the capacity of the capsule or chamber is comparatively small. The forwardly projecting hollow marginal rim $d^3$ has the effect of retarding the flow of water or steam away from the face of the capsule or chamber thus ensuring proper response to the changes of temperature. Moreover, the formation of the capsule or chamber with a rim $d^3$ tends to further distribute the strain on the metal caused by the expansion and contraction of the capsule.

In the construction shown in Fig. 2, the back wall $d^1$ is formed with a hollow marginal rim $d^6$ so that the walls $d$ and $d^1$ are brought still closer together and the sensitiveness of the trap further increased.

What we claim is:—

A steam trap capsule containing expansible fluid comprising opposed circular corrugated metallic plates; one of said plates having its peripheral portion bent abruptly outwardly and then inwardly so as to form an outwardly extending hollow marginal rim terminating in an inwardly extending peripheral flange; the other plate having its peripheral portion bent in an opposite direction and terminating in a peripheral flange fitting within the inwardly extended peripheral flange of the first named plate, whereby the two plates are brought closely together to form a narrow liquid containing chamber; the flanges of the two plates being sealed together.

Signed by ERNEST HENRY STILL at London, England, this 14th day of May, 1925, and signed by ANDREW GEORGE ADAMSON at Eastbourne, Sussex, England, this 13th day of May, 1925.

ERNEST HENRY STILL.
ANDREW GEORGE ADAMSON.